Dec. 26, 1967 C. J. ARNDT 3,360,299
BORING TYPE MINING MACHINE HAVING RIPPER
CUTTER CHAINS GUIDED BETWEEN
BORING HEADS
Filed Oct. 11, 1965 2 Sheets-Sheet 1
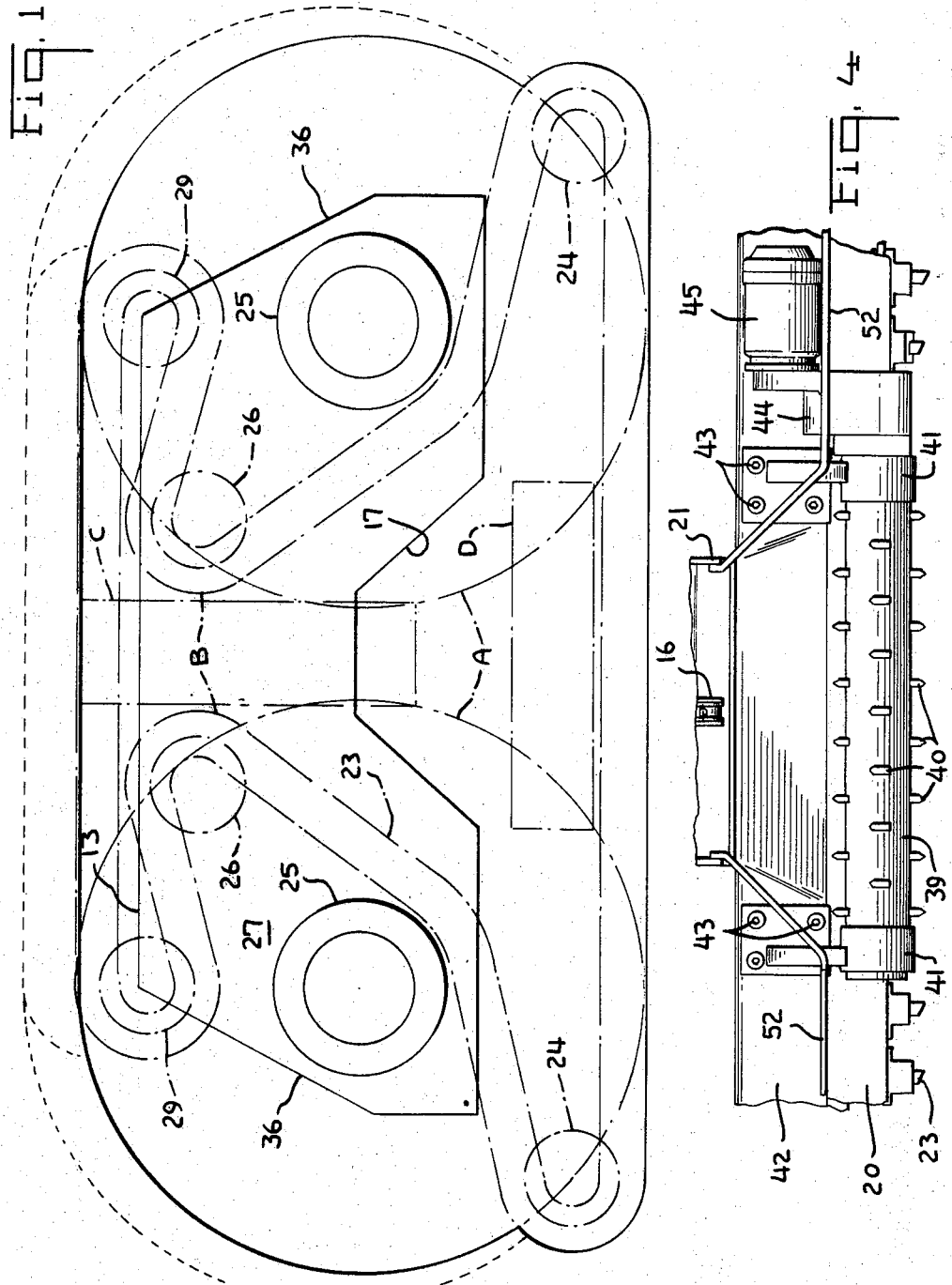
INVENTOR.
CHARLES J. ARNDT
BY Dec. 26, 1967
C. J. ARNDT
3,360,299
BORING TYPE MINING MACHINE HAVING RIPPER
CUTTER CHAINS GUIDED BETWEEN
BORING HEADS
Filed Oct. 11, 1965
2 Sheets-Sheet 2
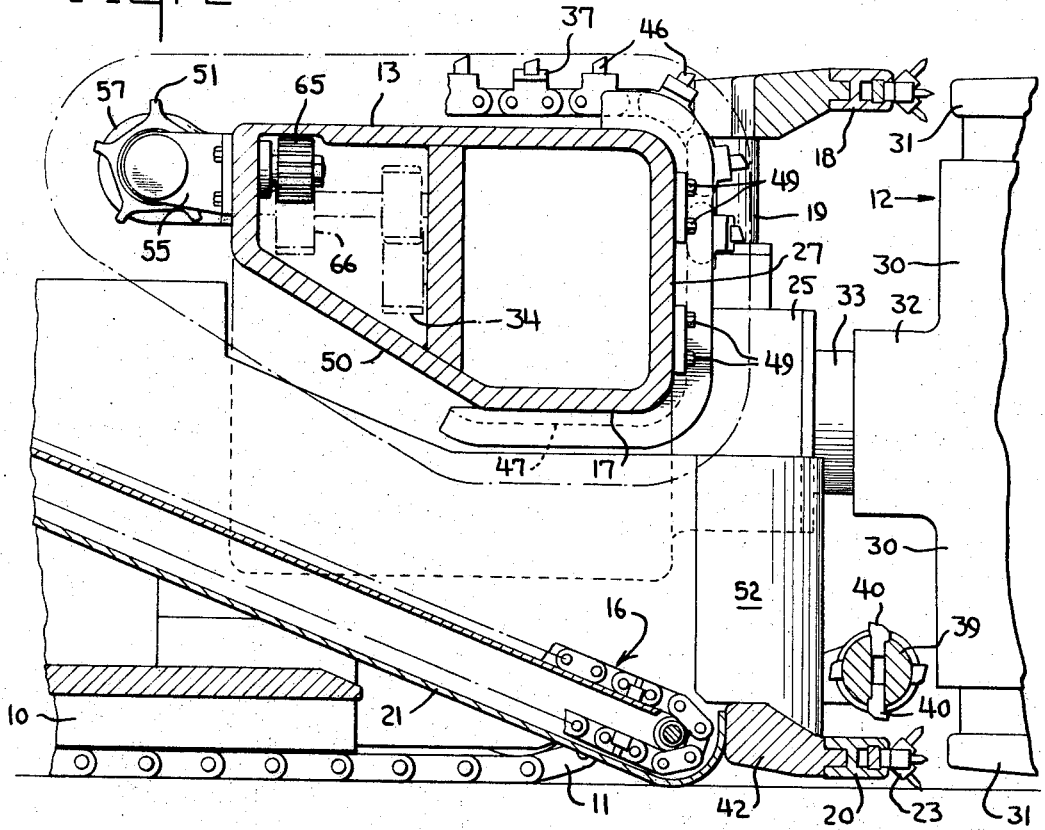
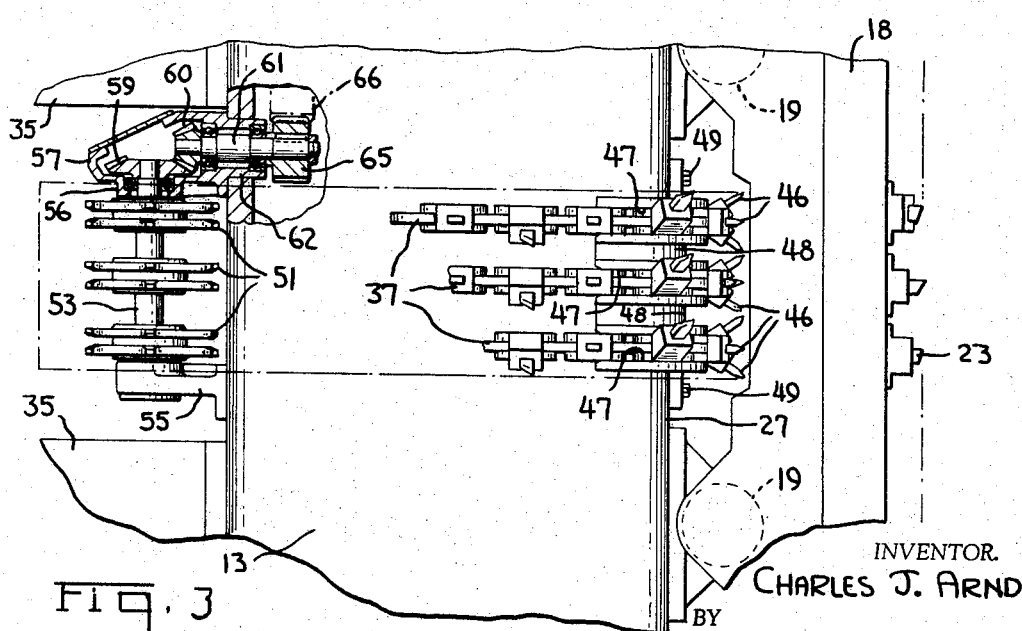
INVENTOR.
CHARLES J. ARNDT United States Patent Office 3,360,299
Patented Dec. 26, 1967

3,360,299
BORING TYPE MINING MACHINE HAVING RIPPER CUTTER CHAINS GUIDED BETWEEN BORING HEADS
Charles J. Arndt, Harvey, Ill., assignor to Westinghouse Air Brake Company, Pittsburgh, Pa., a corporation of Pennsylvania
Filed Oct. 11, 1965, Ser. No. 494,632
10 Claims. (Cl. 299—57)

ABSTRACT OF THE DISCLOSURE

Boring type of continuous mining machine having a plurality of cutter chains guided for movement along the main supporting housing for the boring heads of the machine between the boring heads and along a downwardly facing throat of the main supporting housing extending over the conveyor of the machine. A cooperating rotary cutter bar is also mounted between the boring heads above the lower trimmer chain and cooperates with the ripper cutter chains to effect a substantially complete breaking up of the material between the boring heads to a size which will readily pass along the conveyor of the machine beneath the throat, without clogging the throat.

Background of the invention and objects

This invention relates to improvements in continuous mining machines and more particularly relates to an improved form of boring type continuous mining machine having ripper cutter chains guided between boring heads of the machine.

In continuous mining and loading machines of the rotary boring type having a rotary boring head on each side of the conveyor of the machine, the width of the machine is generally limited by the cutting diameters of the two laterally spaced boring heads plus a throat extending along the conveyor of the machine, which may be overlapped by the boring heads. Where the machine is designed for mining in relatively low seams, it is desirable that the boring heads be spaced farther apart than for mining in high seams in order to obtain adequate production from the machine. As the boring heads are spaced farther apart, the area between the boring heads in front of the throat of the conveyor will be increased leaving a region between the boring heads and the upper and lower trimmer bars in the general form of an hour glass. As a result of this spacing, a similarly formed block of uncut coal will project from the mine face of such a size as to be engaged by the cutter frame of the machine and retard advance of the boring heads and stall the machine.

A principal object of the present invention, therefore, is to provide a rotary boring type of continuous mining and loading machine for mining relatively wide working places, in which the material projecting from the face between the boring heads is mined and broken up by a ripper cutter chain moving vertically along the support for the boring heads.

Another object of the invention is to provide an improved form of continuous mining and loading machine of the rotary boring type having two relatively widely spaced boring heads in which advance of the machine by engagement of the block of coal projecting from the face between the boring heads is obviated by providing a series of ripper cutter chains guided in the support structure for the rotary boring heads in general alignment with the conveyor of the machine, and cooperating with a power driven rotary cuttter bar extending across the front of the conveyor beneath and in advance of the ripper cutter chains.

Still another object of the invention is to improve upon the continuous mining machines heretofore in use having a pair of rotary boring heads with a conveyor therebetween and upper and lower trimmer bars having a trimmer chain guided for movement therealong for trimming the cusps along the roof and floor of the mine, in which the trimmer chain is so trained as to mine between the upper and lower trimmer bars in the space between the boring heads to break down the material therebetween.

Another object of the invention is to provide a continuous mining machine having upper and lower trimmer bars and laterally spaced boring heads on opposite sides of a material carrying conveyor of the machine having a series of ripper chains driven about the support for the boring heads, and trimmer bars, in the space between the boring heads, and cooperating with the trimmer chain to mine and break up the material projecting from the face between the boring heads and progress the material onto and along the conveyor of the machine.

A still further object of the invention is to provide an improved form of continuous mining machine having two relatively widely spaced rotary boring heads, in which the unmined material between the boring heads and the trimmer chains of the machine and projecting from the face is mined and progressed onto the conveyor of the machine by a ripper cutter and a cooperating rotary cutter bar, both of which are driven to mine, break up and progress the material onto the conveyor of the machine.

These and other objects of the invention will appear from time to time as the following specification proceeds and with reference to the accompanying drawings wherein:

FIGURE 1 is a diagrammatic end view of a continuous mining machine constructed in accordance with the principles of the present invention;

FIGURE 2 is a partial fragmentary longitudinal sectional view taken through the front part of the continuous mining machine shown in FIGURE 1;

FIGURE 3 is a partial fragmentary plan view of the central front portion of the machine, with certain parts broken away and certain other parts shown in horizontal section; and FIGURE 4 is an enlarged partial fragmentary top plan view of the central part of the machine and showing the rotary cutter bar extending in front of the conveyor of the machine for breaking down the lumps and progressing the material to the conveyor of the machine.

In the embodiment of the invention illustrated in the drawings I have partially shown in FIGURES 1 and 2, a continuous mining machine of the rotary boring type including a mobile main frame 10 supported on laterally spaced continuous traction tread devices 11, which serve to tram the machine from working place to working place and to feed a pair of laterally spaced boring heads 12, 12 into the working face of a mine. The continuous traction tread devices 11 may be of any conventional form and may be driven from individual motors and speed reducers (not shown), in a manner well known to those skilled in the art, so not herein shown or described further.

The mining machine also includes a superstructure or cutter frame structure 13 supported on and extending ahead of the main frame 10 and forming a support for the boring heads 12, 12 and a gear housing for the drive gearing for driving said boring heads. The cutter frame structure 13 may be supported on the main frame 10 for vertical and angular adjustment with respect thereto in a conventional manner, which is no part of the present invention so need not herein be shown or described.

A conveyor 16 extends along the main frame 10 from a position adjacent the ground in advance of the forward end of said main frame in an upwardly inclined direction and along the top of said main frame to the rear end thereof. The conveyor 16 may be a conventional form of endless chain and flight conveyor having a laterally flexible rear end portion (not shown) accommodating the discharge of the mined material to either side of the machine. The conveyor 16 extends beneath and along a throat 17 formed in the underside of the cutter frame structure 13, between the boring heads 12, 12.

An upper trimmer bar 18 is mounted on the cutter frame structure 13 in advance of the forward end thereof, on laterally spaced hydraulic jacks 19, mounted on the front face of the cutter frame structure 13, and serving to support and vertically adjust said trimmer bar with respect to said cutter frame structure, and to hold said trimmer bar in a selected position of adjustment. A lower trimmer bar 20 extends across the front of the conveyor 16 and is mounted on and extends forwardly of a frame 21 for the conveyor. The lower trimmer bar 20 may be vertically adjustable to clear the ground to accommodate the machine to be trammed from working place to working place by the adjusting jacks for the front end portion of the conveyor (not shown).

A trimmer chain 23 is trained along the lower trimmer bar 20 around corner sprockets 24, 24 at opposite ends of said trimmer bar. From thence the trimmer chain extends inwardly and angularly upwardly and is suitably guided along the undersides of hubs 25, 25 and upwardly and inwardly therefrom to and around drive sprockets 26, 26 suitably mounted on a front face 27 of the cutter frame structure 13, and driven from drive gearing (not shown) housed within said cutter frame structure. The drive gearing for driving the sprockets 26, 26 may be driven from the drive gearing for driving the rotary boring heads 12, 12 and may be of any conventional form, so need not herein be shown or described further. From the drive sprockets 26, 26 the cutter chain 23 extends outwardly and to and about corner sprockets 29, 29 at opposite ends of the upper trimmer bar 18 and training said trimmer chain to travel along said trimmer bar and cut out the cusps depending from the roof in a conventional manner.

It may be seen from FIGURE 1 that the sprockets 26, 26 train the trimmer chain 23 to pass inwardly of cutting patterns A, A of the boring heads 12, 12 and cut along cutting patterns B, B to aid in breaking down the material between said boring heads for discharge onto the conveyor 16.

The rotary boring heads 12, 12 may be conventional forms of rotary boring heads having a diametral boring arm 30 having cutter supports 31, 31 adjustably mounted thereon at opposite ends thereof, and extending forwardly therefrom, for making the boring cuts in the mine face and defining the ribs of the working place, in cooperation with central pilot cutters (not shown) in a conventional manner. The diametral arm 30 is shown as extending from a hub 32 mounted on a shaft 33, suitably journalled in the hub 25, projecting forwardly of the cutter frame structure 13. Suitable drive gearing contained within said cutter frame structure and including a spur gear train 34, may be provided to drive said rotary boring heads from laterally spaced motors 35, 35 extending rearwardly of said cutter frame structure and fragmentarily shown in FIGURE 3. The motors, the mounting of the motors on the cutter frame structure and the drive from the motors to the rotary boring heads are of a conventional form and are no part of the present invention so need not herein be shown or described further.

Referring now in particular to certain of the novel features of the invention, the cutter frame structure 13 is diagrammatically shown in FIGURE 1 as supporting the hubs 25, 25 to extend longitudinally forwardly therefrom adjacent the lower outer end portions of said cutter frame structure. This supports the boring heads 12, 12 a relatively wide distance apart, to mine substantial distances beyond opposite sides of the cutter frame.

The boring heads 12, 12 being widely spaced apart, cut in cutting patterns indicated by dash dot lines A, A in FIGURE 1 and spaced apart on opposite sides of the center of the throat 17, as may be seen in FIGURE 1. This leaves a relatively large block or core of uncut material between the upper and lower trimmer bars and the cutting paths of the boring heads, which projects from the face and frequently extends far enough from the face to engage the cutter frame and retard advance of the machine and penetration of the boring heads into the material being mined. In order to avoid the retarding of the penetration of the boring heads and stalling of the machine at times, a series of ripper cutter chains 37, 37 is driven and guided to move along the front face 27 of the cutter frame structure. As herein shown, the ripper cutter chains are driven downwardly along the front face 27 of the cutter frame structure and inwardly along the throat 17, above the conveyor 16 and are guided to cut in a cutting pattern C indicated by dot dash lines in FIGURE 1. The ripper cutter chains may, of course, be driven upwardly along the front face 27 under certain conditions of mining.

The lower end portion of the block is mined or broken from the face and progresses onto the conveyor 16 by a rotary cutter bar 39 having cutter bits 40, 40 extending radially therefrom. The rotary lutter bar 39 may be like that shown and described in Patent No. 3,086,761 which issued to Cedric E. McWhorter on April 23, 1963, and is adapted to break up or mine the lower end portion of the block to a size that it will not retard advance of the machine and may be loaded onto the conveyor and is shown by dot dash lines in FIGURE 1 as having a breaking or cutting pattern D extending transversely of the boring heads.

As shown in FIGURE 4 the rotary cutter bar 39 is journalled in bearing supports 41, 41 spaced beyond opposite sides of the conveyor 16 and secured to the top face of a support 42 for the lower trimmer bar 20, as by machine screws 43. One end of the rotary cutter bar projects outwardly of its support 41 into a gear housing 44 and is driven from a motor 45 mounted on the top surface of the support 42 through suitable drive gearing (not shown) contained within said gear housing. The motor 45 is shown as being positioned inside of a pusher plate 52 of a conventional form, cooperating with the trimmer chain and rotary boring heads to effect the progression of material onto the conveyor 16.

The ripper chains 37, 37 may be conventional cutter chains having cutter bits 46, 46 projecting therefrom and arranged in a pattern to cut along the center of said ripper chain and to each side thereof to cut clearance for the chain in a conventional manner.

As shown in FIGURES 2 and 3 the ripper chains 37 are guided in parallel outwardly opening channeled guides 47, spaced apart by spacers 48. The channeled guides 47, as shown in FIGURE 2, extend along the top and forward end portion of the cutter frame structure 13 and turn downwardly to extend downwardly along the front face 27 of said cutter frame structure, to which they are secured as by machine screws 49, 49. From thence the guides 47 extend rearwardly along the bottom of the cutter frame structure 13 along the throat 17 to an upwardly inclined bottom wall 50 of said cutter frame structure. The cutter chains 37 extend rearwardly of the guides 47 along said upwardly inclined bottom wall in spaced relation with respect thereto to a series of spaced drive sprockets 51, 51, keyed or otherwise secured to a transverse drive shaft 53. The drive shaft 53 is supported in rearwardly spaced relation with respect to the rear wall of the cutter frame structure 13 and is journalled at one end in a bearing bracket 55 secured to and extending outwardly of the rear wall of the cutter frame structure 13. The opposite end of said drive shaft extends through an inner end wall 56 of the gearing housing 57 and is journalled therein. A bevel gear 59 is keyed or otherwise secured to the end of the drive shaft 53 within the gear housing 57, and is meshed with and driven from a bevel pinion 60 on a longitudinal shaft 61. The shaft 61 is journalled in a hollow boss 62 extending inwardly of the housing 57 through the rear end wall of the cutter frame structure, and formed integrally with said gearing housing. A pinion 65, keyed or otherwise secured to the inner end of the shaft 61, meshes with and is driven from a spur gear 66 driven from the spur gear train 34 driving the boring heads 12, 12 and trimmer chain 23. The ripper chains 37, 37 are thus continuously driven to move downwardly in the space between the cutting paths A, A of the boring heads 12, 12 to rip or break down any material projecting from the face between the boring heads, and to cooperate with the projecting portions of the trimmer cutter chain 23 passing about the sprockets 26, 26 and with the rotary cutter bar 39 to break down the material and progress the broken down material onto the conveyor 16 along the throat 17.

It may be seen from the foregoing that with the present ripper cutter structure cooperating with the rotary breaker or cutter bar 39, it is possible to space the rotary boring heads farther apart than conventional, and to break down the hour glass mass of coal between the boring heads and upper and lower trimmer bars by the ripper cutter chains 37, 37, cooperating with the rotary cutter bar 39 and with the projecting end portions of the trimmer chains projecting angularly inwardly of the cutting paths of the boring heads, to effect a substantially complete breaking down of the material to a size which will readily pass along the conveyor 16 beneath the throat 17 without clogging or jamming the throat.

While I have herein shown and described one form in which the invention may be embodied, it may be understood that various variations and modifications in the invention may be attained without departing from the spirit and scope of the novel concepts thereof.

I claim as my invention:

1. In a continuous mining machine having a mobile main frame,
    a cutter frame mounted at the front end of said main frame and projecting forwardly therefrom,
    a pair of laterally spaced rotary boring heads mounted on said cutter frame for rotation about parallel axes extending longitudinally of said main frame,
    a conveyor spaced between said boring heads and extending rearwardly along said main frame from a position adjacent the ground in advance of the forward end of said main frame,
    said cutter frame having a front face facing said boring heads and a throat extending along and opening toward said conveyor,
    a plurality of parallel spaced ripper cutter chains guided for movement about said cutter frame coincident with the space between the cutting paths of said boring heads, downwardly along said front face of said cutter frame and rearwardly along said throat,
    and means driving said ripper cutter chains to move downwardly along the forward face of said cutter frame and rearwardly along said throat to dislodge and break up the unmined material projecting from the face between said boring heads.

2. A continuous mining machine in accordance with claim 1,
    wherein a power driven rotary cutter bar extends in front of said conveyor beneath said ripper cutter chains across the space between said boring heads and is rotatably driven to break down and progress the material projecting from the mine face between said boring heads rearwardly toward said conveyor.

3. In a continuous mining machine having a mobile main frame,
    a cutter frame mounted thereon and projecting forwardly therefrom and having a central downwardly opening throat,
    a conveyor extending along said main frame from a position in advance of the forward end thereof adjacent the ground and rearwardly therealong beneath said throat,
    a pair of laterally spaced rotary boring heads mounted on said cutter frame adjacent opposite sides thereof for rotation about parallel longitudinal axes and defining cutting paths spaced apart at the center of the machine, the improvements comprising:
        upper and lower trimmer bars mounted on said cutter frame behind said boring heads,
        a cutter chain guided along said trimmer bars,
        drive sprockets changing the directions of said cutter chain to pass to and from said upper trimmer bar, disposed inwardly of opposite ends of said trimmer bar and positioning said cutter chain inwardly of the cutting paths defined by said boring heads, to aid in breaking down the material between said boring heads,
        and a plurality of parallel spaced ripper cutter chains guided for movement about said cutter frame downwardly along the front face thereof and rearwardly along said throat above said conveyor, and driven to move downwardly along the front face of said throat and rearwardly along said conveyor.

4. A continuous mining machine in accordance with claim 3,
    wherein a rotary cutter bar is mounted on the top of said lower trimmer bar in front of said conveyor and is rotary driven to cooperate with said ripper cutter chains to dislodge the material extending from the face between the boring heads and to progress the dislodged material onto said conveyor along the throat of said cutter frame.

5. In a continuous mining machine having a mobile main frame,
    a conveyor extending along said main frame from a position adjacent the ground in front of said main frame to a discharge position beyond the rear of said main frame,
    a cutter frame mounted on said main frame in vertically spaced relation with respect thereto and extending in advance thereof,
    said cutter frame having a generally vertically extending front face and a central throat extending over and along said conveyor,
    a pair of widely-spaced laterally aligned rotary boring heads mounted on said cutter frame for rotation about longitudinal axes spaced from opposite sides of said conveyor,
    each boring head adapted to mine an outer area defining curved side walls of the mine passage, and an inner area spaced from opposite sides of the center of said cutting frame and rotating in a direction to progress the cuttings towards said conveyor,
    and at least one ripper cutter chain guided for movement about said cutter frame in rearwardly spaced relation with respect to the space between said rotary boring heads,
    said cutter chain being movable downwardly along said front face and inwardly along said throat above said conveyor, for dislodging the unmined material projecting from the face between said boring heads and progressing the dislodged material onto said conveyor,
    and a drive sprocket at the rear end of said cutter frame meshing with said cutter chain and driving said cutter chain to progress downwardly along the front face of said cutter frame and rearwardly along said throat.

6. A continuous mining machine in accordance with claim 5,
    wherein a rotary cutter bar is mounted on said main frame beneath said throat and ripper cutter chain and extends forwardly therefrom in front of said conveyor and is driven to break the material between said boring heads and to cooperate with said ripper cutter chain to dislodge and progress the broken up material onto said conveyor and along said throat.

7. In a continuous mining machine having a mobile main frame,
a conveyor extending along said main frame from a position adjacent the ground in front of said main frame to discharge position beyond the rear of said main frame,
a cutter frame mounted on said main frame in vertically spaced relation with respect thereto and extending in advance thereof,
said cutter frame having a generally vertically extending front face and a central throat extending over and along said conveyor,
a pair of widely-spaced laterally aligned rotary boring-heads mounted on said cutter frame for rotation about longitudinal axes spaced from opposite sides of said conveyor,
each boring head adapted to mine an outer area defining curved side walls of the mine passage, and an inner area spaced from opposite sides of the center of said cutter frame and rotating in a direction to progress the cuttings toward said conveyor,
upper and lower trimmer bars mounted on said cutter frame behind said boring heads,
an endless trimmer chain guided for movement along said trimmer bars for trimming the cusps upstanding from the mine floor and depending from the mine roof,
and laterally spaced drive sprockets mounted on said cutter frame and disposed beneath said upper trimmer bar on opposite sides of the longitudinal center of the machine, and positioning said trimmer chain as it turns thereabout to cut beneath said upper trimmer bar inwardly of the inner area mined by said boring heads.

8. A continuous mining machine in accordance with claim 7,
wherein a plurality of channeled chain guides extend along the top of said cutter frame, downwardly along the front face thereof and rearwardly along said throat,
wherein endless cutter chains are guided along said chain guides and extend about said cutter frame,
and wherein drive sprockets disposed rearwardly of said cutter frame mesh with and drive said cutter chains to move downwardly along the front face of said cutter frame and rearwardly along said throat.

9. A continuous mining machine in accordance with claim 8,
wherein a rotary cutter is mounted on said lower trimmer bar beneath and in advance of said throat and extends across the front of said conveyor,
and wherein an independent motor is provided to drive said rotary cutter to cooperate with said ripper cutter chains and break up the lumps and progress the lumps onto said conveyor and along said throat.

10. In a continuous mining machine having a mobile main frame,
a conveyor extending along said main frame from a position adjacent the ground in front of said main frame to a discharge position beyond the rear of said main frame,
a cutter frame mounted on said main frame in vertically spaced relation with respect thereto and extending in advance thereof,
said cutter frame having a generally vertically extending front face and central throat extending over and along said conveyor,
a pair of widely-spaced laterally aligned rotary boring heads mounted on said cutter frame for rotation about longitudinal axes spaced from opposite sides of said conveyor,
each boring head adapted to mine an outer area defining curved side walls of the mine passage, and an inner area spaced from opposite sides of the center of said cutting frame and rotating in a direction to progress the cuttings toward said conveyor,
upper and lower trimmer bars mounted on said cutter frame behind said boring heads,
and endless trimmer chain guided for movement along said trimmer bars for trimming the cusps upstanding from the mine floor and depending from the mine roof,
laterally spaced drive sprockets mounted on said cutter frame and disposed beneath said upper trimmer bar on opposite sides of the longitudinal center of the machine, and positioning said trimmer chain as it turns thereabout to cut beneath said lower trimmer bar inwardly of the inner area mined by said boring heads,
and a plurality of ripper cutter chains disposed between the cutting paths of said boring heads and guided for movement along the front face of said cutter frame and driven to dislodge the unmined material projecting from the face between said boring heads in cooperation with said trimmer chains and to progress the dislodged material along said conveyor, and to thereby accommodate positioning of said boring heads to mine in paths extending substantial distances outwardly of the outer margins of said cutter frame.

References Cited
UNITED STATES PATENTS
3,096,082   7/1963   Long _____ 299—59 X FOREIGN PATENTS
80,936   1951   Czechoslovakia.

ERNEST R. PURSER, *Primary Examiner.*